United States Patent Office 3,403,612
Patented Oct. 1, 1968

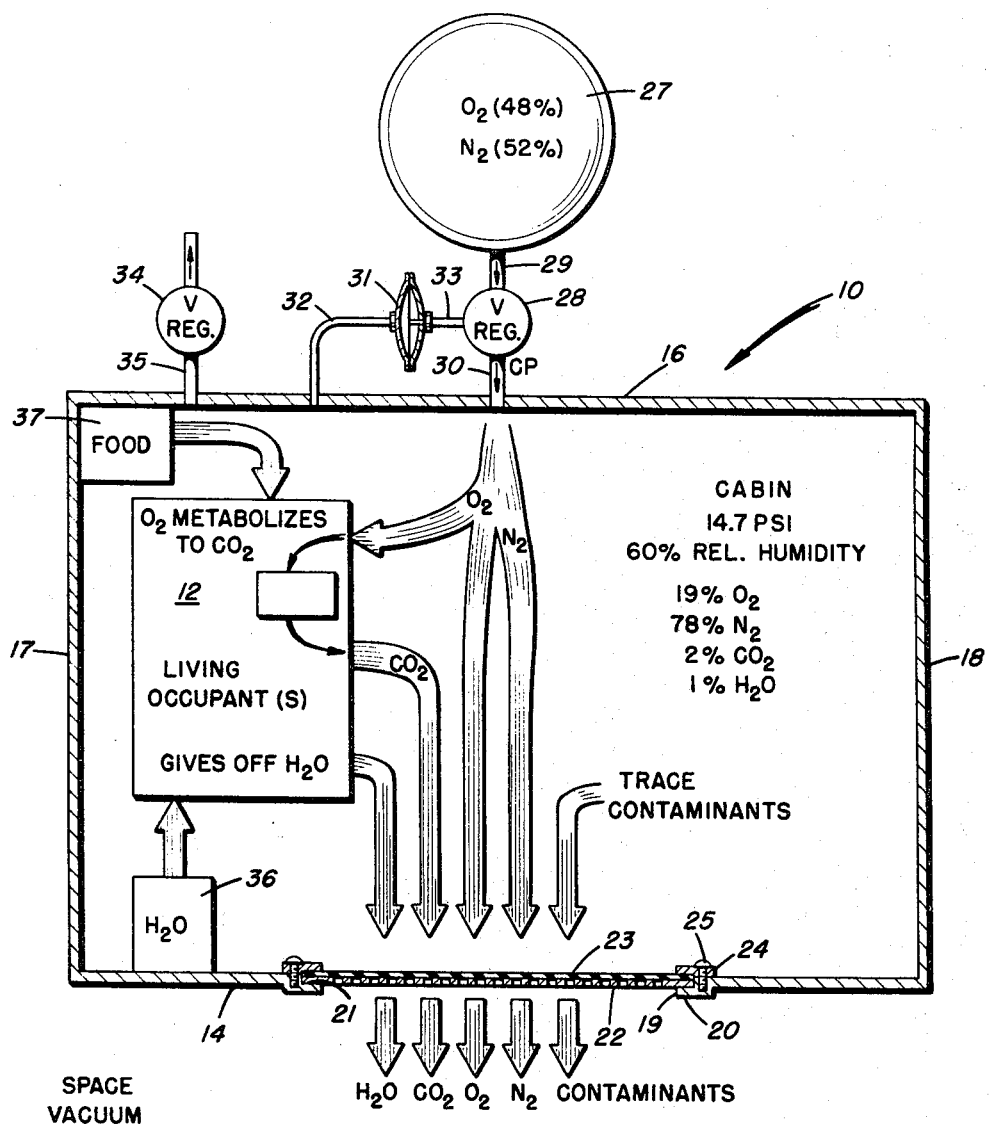
CHARLES J. SWET
ROSCOE G. BARTLETT, Jr.
INVENTORS

3,403,612
METHOD OF AND APPARATUS FOR ATMOS-
PHERE REPLENISHMENT AND CONTROL
Charles J. Swet, Mount Airy, and Roscoe G. Bartlett, Jr.,
Lime Kiln, Md., assignors to the United States of America as represented by the Secretary of the Navy
Filed Sept. 12, 1966, Ser. No. 578,890
4 Claims. (Cl. 98—1.5)

ABSTRACT OF THE DISCLOSURE

The present invention provides a means for discharging $CO_2$ and contaminants given off by a living creature in a satellite cabin and replacing such discharge with a life-sustaining atmosphere in accordance with the metabolic requirements of each creature. The cabin containing the living creature is provided with an ultra-thin membrane which exhibits a highly selective permeability to various gases. In particular, the flow rate of water vapor and $CO_2$ through the membrane is several orders of magnitude greater than oxygen and nitrogen gas flow. Replacement of the waste gases and maintenance of the life-sustaining atmosphere is provided by tanks of nitrogen and oxygen and an appropriate pressure sensor.

---

The present invention relates to a method and apparatus for producing a life-sustaining atmosphere. More particularly, the invention pertains to a method and apparatus for producing, in an enclosure, a breatheable atmosphere which is maintained as to content in accordance with the requirements of a living creature in the enclosure.

One object of the invention is to provide a method and apparatus for the purpose stated hereinabove wherein atmosphere control is effected by discharging excess carbon dioxide and contaminants from the enclosure and replenishing the same with oxygen and nitrogen in the required amounts.

Another and more specific object of the invention resides in the provision, in a method and apparatus for producing a life-sustaining atmosphere, of means including a selectively permeable membrane for discharging from the enclosure carbon dioxide and contaminants produced by the living creature therein, and a source of a breatheable atmosphere to replenish that consumed by the creature.

As a further object the invention provides a method and apparatus for producing a life sustaining atmosphere wherein the thickness and area of the permeable membrane employed and the proportion of oxygen and nitrogen supplied to the enclosure are predetermined in accordance with the requirements of the living creature in said enclosure.

In the drawing, the single figure is a schematic view illustrating the apparatus of the invention.

Briefly, the present invention contemplates a cabin or other enclosure for housing a living creature, the cabin having a discharge opening in which is mounted a selectively permeable membrane of very thin silicone rubber. The membrane permits the escape from the cabin, at predetermined rates, of carbon dioxide and other contaminants. The invention also provides a source of oxygen and nitrogen to replenish the breatheable atmosphere in the cabin, in accordance with the requirements of the creature therein. It should be understood that although the invention was designed primarily for use with space vehicles such as satellites, it may be used in any application in which it is desired to simulate the earth's atmosphere.

Referring now to the drawing, a cabin is designated schematically at 10 and a living creature in the cabin at 12. The cabin has a bottom wall 14, a top wall 16 and side walls 17 and 18. An opening 19 is formed in the bottom wall 14 and, as will be seen, said wall is depressed adjacent said opening to form a flange 20 which defines a seat 21. Mounted in the opening and having its margins in the seat 21 is a supporting plate 22 which may conveniently be of foraminous material. The plate 22 provides support for an extremely thin selectively permeable membrane 23 which is formed of silicone rubber. For clarity the thickness of the membrane 23 is exaggerated in the drawing. The supporting plate 22 and membrane 23 thereon are held in place in the opening by a clamping strip 24 and suitable fasteners 25.

Although we do not claim the selectively permeable membrane 23 itself as our invention, it is believed that a discussion of it would be helpful. Laboratory tests on a selectively permeable membrane one square yard in area and one mil thick produced the following flow data, in liters per hour, for a differential partial pressure of one atmosphere:

$H_2O$ ---------------------------------------- 3800
$CO_2$ ---------------------------------------- 320
$O_2$ ----------------------------------------- 60
$N_2$ ----------------------------------------- 28

If the above data is converted to overboard leakage from a spacecraft cabin atmosphere to the vacuum of space, the following data are obtained:

| Gas | Partial pressure (atmospheric) | Leakage | |
|---|---|---|---|
| | | Liters per hr. | Grams per hr. |
| $H_2O$ (vapor) | 0.01 | X3800 38.0 | 30.5 |
| $CO_2$ | 0.02 | X320 6.4 | 12.6 |
| $O_2$ | 0.20 | X60 12.0 | 17.2 |
| $N_2$ | 0.78 | X28 21.8 | 27.2 |

Let it be assumed that the living creature 12 in the cabin 10 gives off carbon dioxide ($CO_2$) at the conveniently chosen rate of 6.4 liters per hour, and can tolerate a 2% concentration of $CO_2$ in the cabin atmosphere. A $CO_2$ equilibrium will thus be established, where the creature's output equals the leakage rate, through the selectively permeable membrane 23, at a pressure differential of 0.02 atmosphere. It will accordingly be understood that one essential ingredient of any atmospheric control system has been provided, namely, an excess $CO_2$ remover.

The method and apparatus required to provide atmosphere replenishment in the cabin 10 will now be described. Referring again to the figure of the drawing, a supply tank is shown schematically at 27. The supply tank normally contains an atmosphere consisting of 48% oxygen ($O_2$) and 52% nitrogen ($N_2$), and is connected to the cabin through a regulating valve 28 and suitable ducts 29 and 30. It may conveniently be mounted above the top wall 16 or in any other desired location. A sensor 31, which may be of the diaphragm-controlled type, is connected between the valve 28 and the interior of the cabin by pipes 32 and 33. A relief valve 34 is connected with the interior of the cabin 10 by a pipe 35, and operates to remove excess pressure from within the cabin. Within the cabin a supply of water is shown at 36, which supply is available to the living creature 12. A food supply for the creature is also shown in the cabin at 37.

To provide atmosphere replenishment in the cabin 10 it is necessary that nitrogen be admitted to said cabin at a rate that matches the unavoidable leakage which accompanies the removal of the $CO_2$. This is also true of oxygen, but an additional amount must be furnished to supply the creature's metabolic needs. Oxygen and nitrogen are supplied from the tank 27 to the interior of the cabin through the valve 28, as controlled by the sensor 31, the sensor being calibrated to detect changes from the desired total atmospheric pressure in the cabin.

Based on an assumed respiratory quotient of 0.8, i.e., the mol ratio of carbon dioxide produced to oxygen consumed, another 8.0 liters of oxygen must be added each hour, making a total of 20. Since the required composition of the make-up atmosphere is then known, i.e., 20 liters of oxygen to 21.8 liters of nitrogen, the blend of gases from the tank 27 can be admitted as required to maintain the total cabin pressure at the desired level of one atmosphere while also maintaining the required composition. In this connection it should be understood that the valve 28 and the sensor 31 are conveniently in the form of an integral pressure valve assembly, and the valve 34 is a conventional pressure relief valve.

The function of water removal, like the removal of excess carbon dioxide, is effected by the selectively permeable membrane 23, as shown in the drawing. If the metabolic water output (urine, feces, perspiration, water of hydration, etc.) were 30.5 grams per hour, the equilibrium partial pressure of the water vapor in the atmosphere of cabin 10 would correspond to a maintained relative humidity of roughly 60% at normal room temperatures. The successful operation of the present invention presupposes a knowledge of the respiratory quotient of the living creature in the cabin and of its average metabolic rate. Such data, however, are predictable and may be readily determined. Short term fluctuations in metabolic rate could create temporary deviations from the nominal cabin atmosphere composition, but such changes would be minor for cabins of reasonable size having creatures therein following routine activities. Errors in prediction would have to be substantial to create physiologically unacceptable long term deviations. It should be recognized that the extreme simplicity of the invention and the operation thereof is attainable at a rather high cost in overboard leakage, i.e., through the membrane 23, which might prove excessive in some applications. The correspondingly high flushing rate, however, assures against contaminant buildup within the cabin 10, and the mass of wasted gas must be compared with the weight saved by the elimination of multiple supply tanks and sensors, catalytic burners, and a separate carbon dioxide removal system.

What is claimed is:
1. The method of producing a life-sustaining atmosphere within an enclosure containing a living creature, which comprises the steps of
   introducing a breatheable atmosphere into the enclosure,
   establishing a pressure differential within the enclosure,
   utilizing the pressure differential for facilitating the discharge from the enclosure, through associated selectively permeable membrane means, of excess carbon dioxide and other contaminants produced by the creature, and
   sensing the pressure within the enclosure whereby an additional breatheable atmosphere supply may be introduced into the enclosure in accordance with the requirements of the living creature.
2. In a non-cyclic system for producing a life-sustaining atmosphere,
   a cabin suitable for housing a living creature and having a discharge opening,
   a source of breathable atmosphere introducible to the cabin,
   membrane means for discharging from the cabin, at predetermined rates, gases produced by a living creature in said cabin, said membrane means selectively discharging at a more rapid rate than the discharge of oxygen and nitrogen those gases metabolically produced by the living creature and further discharging gaseous water at a rapid rate, thereby riding the cabin of waste liquids and maintaining an acceptable humidity level.
3. The system of claim 2 and further comprising
   means for mounting the membrane means in the discharge opening,
   said means for mounting comprising a plate of foraminous material and a clamping strip securing said membrane and plate in the discharge opening.
4. The system of claim 3 and further comprising
   means for sensing pressure changes within the cabin, and
   means for replenishment of the breathable atmosphere in the cabin in accordance with the requirements of the living creature as sensed by the sensing means,
   said replenishment means comprising pressurized oxygen and nitrogen in such ratio as to allow for the metabolic consumption of the living creature and for the natural flushing of the gases through the membrane.

References Cited
UNITED STATES PATENTS

| | | | |
|---|---|---|---|
| 3,215,057 | 11/1965 | Turck | 98—1.5 |
| 3,228,394 | 1/1966 | Ayres | 128—145 |
| 3,333,583 | 8/1967 | Bodell | 128—142 |

MEYER PERLIN, *Primary Examiner.*